United States Patent
Kehr et al.

(10) Patent No.: US 12,316,690 B2
(45) Date of Patent: May 27, 2025

(54) METHOD AND SYSTEM FOR MUTUAL CONSENSUS OF MEETING PARTICIPANTS IN ESTABLISHED REAL-TIME SESSIONS

(71) Applicant: Unify Patente GmbH & Co. KG, Munich (DE)

(72) Inventors: Manfred Kehr, Munich (DE); Thomas Lederer, Herrsching (DE)

(73) Assignee: Unify Beteiligungsverwaltung GmbH & Co. KG, Munich (DE)

( * ) Notice: Subject to any disclaimer, the term of this patent is extended or adjusted under 35 U.S.C. 154(b) by 252 days.

(21) Appl. No.: 18/295,286

(22) Filed: Apr. 4, 2023

(65) Prior Publication Data

US 2024/0039973 A1 Feb. 1, 2024

(30) Foreign Application Priority Data

Jul. 29, 2022 (EP) .................................. 22 187 909

(51) Int. Cl.
*H04L 65/403* (2022.01)
*H04L 65/1069* (2022.01)

(52) U.S. Cl.
CPC ........ *H04L 65/403* (2013.01); *H04L 65/1069* (2013.01)

(58) Field of Classification Search
CPC .......................... H04L 65/403; H04L 65/1069
See application file for complete search history.

(56) References Cited

U.S. PATENT DOCUMENTS

| | | |
|---|---|---|
| 2013/0178959 A1 | 7/2013 | Hirsch |
| 2016/0072862 A1 | 3/2016 | Bader-Natal et al. |
| 2019/0268385 A1* | 8/2019 | Faulkner ............... G06F 16/783 |
| 2020/0126155 A1* | 4/2020 | Overholser ............ G06Q 40/04 |

OTHER PUBLICATIONS

Extended European Search Report for European Patent Application No. 22187909.1 dated Jan. 23, 2023.

* cited by examiner

*Primary Examiner* — Kristie D Shingles
(74) *Attorney, Agent, or Firm* — Buchanan Ingersoll & Rooney PC

(57) ABSTRACT

A method and a system for mutual consensus of meeting participants in established real-time sessions configured for allowing mutual consensus. In some embodiments, the a virtual meeting can be established between multiple parties (e.g. at least two participants) in which nobody can leave the meeting, or session, until an agreement is reached. In addition, a meeting exit function can be provided to give a moderator control to prohibit participants from leaving the meeting beforehand.

18 Claims, 3 Drawing Sheets

METHOD AND SYSTEM FOR MUTUAL CONSENSUS OF MEETING PARTICIPANTS IN ESTABLISHED REAL-TIME SESSIONS

CROSS-REFERENCE TO RELATED APPLICATIONS

The present application claims priority to European Patent Application No. EP 22 187 909.1 filed on Jul. 29, 2022. The entirety of this patent application is incorporated by reference herein.

FIELD

The present invention relates to a method and a system for mutual consensus of meeting participants in established real-time sessions. In particular, a method and a system are described for virtual meetings (e.g. multi-party sessions including one-to-ones or more than two participant meetings or sessions) thereby allowing mutual consensus (e.g. a meeting lasts and nobody can leave the meeting until an agreement is reached). Embodiments can include a meeting exit function that can be provided and configured to permit a moderator to control the session, or meeting, to prohibit participants from leaving the meeting beforehand.

BACKGROUND

In a real physical meeting with two or more participants, it is not common for a person to leave the room without any type of explanation or justification. This is especially true when it comes to mandatory meetings or discussions such as workplace safety instruction meetings and training meetings etc.

If someone leaves the room before the in-person meeting has ended, another person, (e.g. the facilitator or moderator of the meeting) has the opportunity to point this out and to "forbid" leaving the room or to demand that those who want to leave return immediately. Typically, the end of the in-person meeting is either declared by consensus and/or announced by the facilitator or moderator.

SUMMARY

Currently, we do not believe there are any solutions known to allow or support an intended meeting characteristic that prevents meeting participants to just unilaterally leave a meeting an in online (or virtual) meeting (e.g. a communication session held virtually via communication devices of participants via a network connection using the participants' communication terminals and a communication server that may host the session for the communication terminals). We have determined that on some occasions in real-time voice and/or video conferences or in 1:1 calls it can be required or desired by a meeting organizer, or moderator, that all (or a mandatory subset of) participants of the meeting are present for the duration of the whole meeting or until the moderator (or alternatively all participants) agrees to finish the meeting.

Consequently, the intended virtual meeting scenario can be compared with people physically gathering in a room, then after the meeting starts the room gets locked and nobody is able to leave until an agreement is reached (e.g. everybody agrees, or the moderator ends the meeting and opens the door). This would be comparable to the papal conclave in the election of the Pope in the Roman Catholic Church. Here, the cardinal electors should be locked in seclusion cum clave (Latin for 'with a key') and not permitted to leave until a new pope had been elected.

A further example would be an all-hands call in which the manager of a department or team wants to convey an important message and wants to ensure that all people joined the meeting are not leaving earlier.

Alternatively, there could be the desire of the meeting facilitator that at least a certain number of attendees, (e.g. at least 60% of the originally invited and joined participants or other pre-selected threshold value or proportion) are in the conference at any moment of time until the conference ends (e.g. the system would allow leaving the room until the set threshold is reached).

The prior art known to us only focusses on re-establishing a lost/disconnected connection and allows for easy or establishing an automatic dial-in/reconnection into the meeting.

Therefore, embodiments of the present invention can be based on an object to provide a method and a corresponding system for mutual consensus of meeting participants in established real-time sessions. Some exemplary embodiments of our method and system can be configured so that the participants are prevented from the ability to trigger the hang-up/disconnect for the session, or meeting to avoid intended or accidentally early or temporary leavers of the meeting.

A method for mutual consensus of meeting participants in established real-time sessions can include the steps of: (i) setting up, by an organizer, a real-time conference session on a first entity wherein the organizer using a second entity which is connected to the first entity; (ii) inviting, by the organizer, one or more participant to the real-time conference session wherein the one or more participant using a third or further entity which is connected to the first entity; (iii) requesting, by the organizer and/or the one or more participant, from the first entity to set a consensual call flag (ccflag) allowing the real-time conference session to be held in consensual mode (CM) wherein the organizer and/or the one or more participant can only end or exit the real-time conference session upon predefined exit options; (iv) checking, by the first entity, if the organizer and/or the one or more participant is allowed to set the consensual call flag (ccflag) in case there is no allowance, the consensual call flag (ccflag) is not set and the real-time conference session is configured by the first entity without further predefined exit options. Embodiments of the method can also include otherwise configuring, by the first entity, the real-time conference session with additional predefined exit options upon setting the consensual call flag (ccflag) by the organizer and/or the one or more participant then starting, by the first entity, the real-time conference session immediately or at a time agreed by the organizer and/or the participants.

A real-time conference session may also be referred to as a meeting or a real-time conference, a conference or a session. However, this does not describe a physical meeting, but a virtual meeting (e.g. a meeting facilitated by use of at least one communication network or communication system in which participants utilize communication terminals to participate in the session via the communication network(s) or system(s)). This also comprises a call, for example, via VoIP (Voice over IP), and any kind of video/audio or other possibility to hold a meeting.

According to a preferred embodiment of the invention, the method further comprises determining, by the organizer and/or automatically by the first entity, according to a predefined policy, one or more moderator.

The organizer itself and/or one or more participant can be a moderator of the conference session. The selection of who may or may not be a moderator may depend on whether, for example, a role-based or hierarchical selection system must be taken into account, and this may be present on the first entity or on the second entity. For example, the selection as moderator could be made dependent on the position in an organization or in a company of a participant concerned, e.g. whether he or she is a supervisor or a person responsible for a certain area. Or in case of an interview held via a real-time conference session, the interviewer can be automatically designated as a moderator.

According to another preferred embodiment, the predefined exit options comprising at least one of a dual mode consensus exit, a single mode consensus exit or a majority mode consensus exit.

According to still another preferred embodiment, the dual mode consensus exit comprises that in a 1:1 or that in an n:n real-time conference session all participants of the real-time conference session have to agree to end the real-time conference session.

In the sense of the invention "n" describes an arbitrary number of meeting participants. It should be appreciated that "n" participants can include two participants or more than two participants (e.g. 4 participants, 8 participants, 100 participants, etc.)

Further, according to a preferred embodiment, the single mode consensus exit comprises that in a 1:1 real-time conference session or in a 1:n real-time conference session or in an n:n real-time conference session one or more named moderator must agree to end the real-time conference session and/or wherein the majority consensus exit comprises that in an n:n real-time conference session a majority of N participants must agree to end the real-time conference session.

In the sense of the invention "N" can also describes an arbitrary number of meeting participants. It should be appreciated that "N" participants can include two participants or more than two participants (e.g. 4 participants, 8 participants, 100 participants, etc.)

According to yet another preferred embodiment, the organizer is one of a participant, a user, an artificial intelligence or a bot which is able to set up the conference session and/or wherein the first entity is one of a computer, a server, a media server or a specially configured conference computer or a server which is suitable for operating a real-time conference session and/or wherein one or more second, third or further entity is one of a client, an application implemented on a computer or a server, a client application, a browser-based application, a web-based application, a cloud application or a Software as a Service (SaaS) which is able to connect to the first entity and enable the organizer and/or the one or more participant to participate in the conference session.

In the sense of the invention, an organizer can be understood as the person or user who sets up the conference session. The organizer can later also be a participant in the session. However, it is also possible that the organizer does not participate at all in the subsequent meeting but only sets up or configures it for the other participants such as an assistant for the supervisor. Furthermore, the organizer can also be an artificial intelligence or a bot which can set up the meeting independently based on, for example, entries in calendars or other data.

In the context of the invention, the term first entity can be understood to mean any type of entity that is suitable for operating a real-time conference session. Advantageously, the first entity is a computer, a server, a media server or a specially configured conference computer or server that has sufficient resources to handle a large number of participants and to provide them with a fluid, e.g. uninterrupted, conference session. Furthermore, the first entity that is used must be able to hold a real-time conference session in consensus mode and to configure or provide the necessary options for this.

It should be appreciated that a computer, a server, or a media server is a computer device that includes hardware. The hardware includes at least one processor connected to a non-transitory computer readable medium (e.g. non-transitory memory) and at least one transceiver. At least one input device, output device and/or input/output device can also be communicatively connected to the processor. Such devices can include, for example, a display, a touch screen display, a pointer device, one or more buttons, a keypad, a keyboard, a microphone, a speaker, or other types of input devices and/or output devices.

Each participant or different groups of participants may join a session via their own communication terminal. Examples of these types of communication terminals can include a laptop computer, personal computer, smart phone, tablet, or other type of suitable electronic communication terminal device. Such devices can include at least one processor connected to a non-transitory computer readable medium (e.g. non-transitory memory) and at least one transceiver. At least one input device, output device and/or input/output device can also be communicatively connected to the processor. For example, a communication terminal of one or more participants can include or be communicatively connected to a display, a touch screen display, a pointer device, one or more buttons, a keypad, a keyboard, a microphone, a speaker, or other types of input devices and/or output devices.

In the sense of the invention, the second entity and/or the third or further entity can be a client, an application implemented on a computer or a server, a client application, a browser-based application, a web-based application, a cloud application, a Software as a Service (SaaS) or else. It is important in this context that the second entity and/or the third or further entity is able to connect to the first entity and enable the organizer and/or the one or more participants to participate in the conference session and is configured to hold the conference session in consensus mode and/or to provide the necessary options for this.

Further, a majority of N participants can be understood as a predefined absolute number of participants or a percentage of the total number of participants in the meeting. For example, 40%, 50%, 60%, or more may be predefined as a majority of the N participants of the total participants of the meeting. However, a much smaller number of 30%, 20%, 10% or less of the N participants of the total participants of the meeting can also be considered as a majority. Also, a percentage of only N participants that must agree to end the real-time meeting can be predefined.

According to a preferred embodiment, the method comprises enabling, by the first entity, a hang-up or disconnect option to end or exit the real-time conference sessions for all participants in the 1:1 real-time conference sessions, wherein all participants of the 1:1 real-time conference sessions are enabled to use the hang-up or disconnect option at the same time or within a predefined time window; and/or providing, by the first entity, a notification to the participants of the real-time conference sessions upon using the hang-up or disconnect option by one participant which would then need to be confirmed by the other participant of the 1:1 real-time conference sessions.

According to another preferred embodiment, the method further comprises disabling or hiding, by the first entity, a hang-up or disconnect option to end or exit the real-time conference sessions for all participants in the n:n real-time conference sessions, wherein providing, by the first entity, an option to vote for ending the real-time conference sessions for all participants in the n:n real-time conference sessions, wherein the real-time conference sessions end if all participants in the n:n real-time conference sessions have selected the option to vote for ending the real-time conference sessions.

According to still another preferred embodiment, the method further comprises disabling or hiding, by the first entity, a hang-up or disconnect option to end or exit the real-time conference sessions for all participants except for the one or more named moderator in the 1:1 real-time conference sessions or in the 1:n real-time conference sessions; or providing, by the first entity, an option to ask for permission to leave the real-time conference sessions for all participants except for the one or more named moderator in the 1:1 real-time conference sessions or in the 1:n real-time conference sessions, wherein the one or more named moderator is authorized to grant this permission.

Further, according to a preferred embodiment, the method further comprises determining, by the organizer and/or automatically by the first entity, according to a predefined policy a subset of mandatory participants, wherein providing, by the first entity, an option to vote for ending the real-time conference sessions for all participants in the n:n real-time conference sessions, wherein the real-time conference sessions end, if the subset of mandatory participants in the n:n real-time conference sessions have selected the option to vote for ending the real-time conference sessions.

Such a request for ending the real-time conference sessions might be only valid for a period of time t, in seconds or minutes so that all participants would need to submit that request within a period of time t. For example, the period of time can be at least 30 seconds, 1 minute, 5 minutes or 10 to 15 minutes. The period of time t can be made dependent on the number of participants of the real-time session and/or can be predefined.

According to yet another preferred embodiment, the method further comprises providing, by the first entity, an option to vote for ending the real-time conference sessions for all participants in the n:n real-time conference sessions, wherein the real-time conference sessions end if the majority of N participants in the n:n real-time conference sessions have selected the option to vote for ending the real-time conference sessions.

A system for mutual consensus of the meeting participants in established real-time conference sessions is also provided, wherein the system is adapted to perform the steps of the method for mutual consensus of meeting participants in established real-time conference sessions. Embodiments of the system can include at least one entity that is communicatively connectable to one or more communication terminals of one or more participants (e.g. a server entity that is connectable to multiple terminal devices of other participants, etc.).

According to a preferred embodiment, the system at least comprising a first entity configured to setup and manage real-time conference sessions in a consensus mode (CM) and one or more second, third or further entity which is connected to the first entity and is configured to participate in the real-time conference sessions, wherein the one or more second, third or further entity is configured to end or exit the real-time conference sessions according to pre-defined exit options if a consensual call flag (ccflag) has been set for the real-time conference sessions.

According to another preferred embodiment, the system, if a consensual call flag (ccflag) is set, does not offer or display a hang-up or disconnect option for the one or more second, third or further entity, wherein allowing only a moderator or upon mutual consensus allowing of all participants to end the real-time conference session; or the system, if a consensual call flag (ccflag) is set, replaces the hang-up or disconnect option with a vote for end option for the one or more second, third or further entity, wherein allowing only a moderator or upon mutual consensus allowing of all participants to end the real-time conference session.

According to still another preferred embodiment, the system, if a consensual call flag (ccflag) is set, does not terminate the connection of the one or more second, third or further entity upon a hang-up or disconnect, by the one or more second, third or further entity; or the system, if a consensual call flag (ccflag) is set, terminates the connection upon a hang-up or disconnect, by the one or more second, third or further entity, but the system immediately re-establishes the connection of the one or more disconnected second, third or further entity, wherein if the connection cannot be re-established, the connection to the real-time conference session would be established each time the disconnected one or more second, third or further entity tries to further connect to another different real-time conference session.

When re-establishing the connection, well-solutions for calls which got interrupted can be used. Further, the functionality of the second, third or further entity could be altered depending on the consensual mode (CM) of the real-time conference session, e.g. hide/disable the hang-up/disconnect exit functionality and/or hide/disable consultation functions. In the sense of the invention, it is also possible that an interface window of the second, third or further entity could be made to always remain maximized or to always be in the foreground, e.g. an overlay is prevented.

According to yet another aspect of the present invention, a program element that is stored on a non-transitory computer readable medium is provided. The program element can include code stored on the computer readable medium (e.g. memory) that, when being executed by a processor of a communication device (e.g. server, communication terminal, computer device, etc.) is adapted to carry out steps of the method for mutual consensus of meeting participants in established real-time sessions.

According to another aspect of the present invention, a non-transitory computer-readable medium comprising program code is provided, which when being executed by a processor is adapted to carry out steps of the method for mutual consensus of meeting participants in established real-time sessions.

A non-transitory computer-readable medium may be a floppy disk, a hard disk, an USB (Universal Serial Bus) storage device, a RAM (Random Access Memory), a ROM (read only memory) or an EPROM (Erasable Programmable Read Only Memory). A computer readable medium may also be a data communication network, e.g. the Internet, which may allow downloading a program code.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter, also any combination between features relating to different types of subject-matters is considered to be disclosed with this text. In particular, combinations between features relating to the apparatus type claims and features relating to the method type claims are considered to be disclosed. The invention and embodiments thereof will be described below in further detail in connection with the drawing(s).

Other details, objects, and advantages of the telecommunications apparatus, system, device, non-transitory computer readable medium, and method will become apparent as the following description of certain exemplary embodiments thereof proceeds.

DETAILED DESCRIPTION

Figure 1:
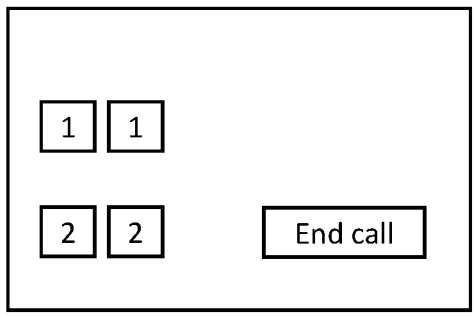
FIG. 1 shows a schematic illustration of an exemplary arrangement of buttons or display options of an interface of a participant communication terminal and/or one or more second, third or further entity according to an embodiment of the invention.

FIG. 1 shows a schematic illustration of an exemplary arrangement of buttons or display options of an interface of one or more second, third or further entity and/or communication terminals of participants. In this case for a conference session is not held in consensus mode. All participants have an option to end or exit the meeting which is indicated by the button "End call" and a reference like "consensual call" is of course not displayed.

Figure 2:
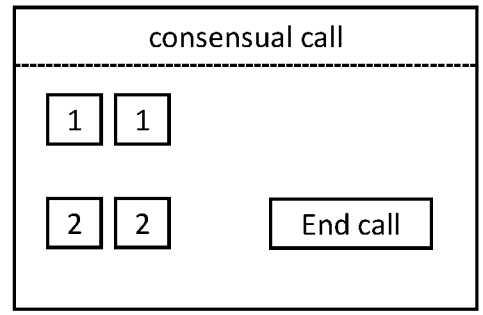
FIG. 2 shows a schematic illustration of an exemplary arrangement of buttons or display options of an interface of a participant communication terminal and/or one or more second, third or further entity according to an embodiment of the invention.

FIG. 2 shows a schematic illustration of an exemplary arrangement of buttons or display options of an interface of one or more second, third or further entity or communication terminals of participants. In this case for a conference session held in consensus mode with a named moderator. The view of the moderator is shown, whereby the reference "consensual call" indicates to all participants that the session is taking place in consensus mode. In this case, however, only the moderator has the option of ending the session by using the option "End call".

Figure 3:
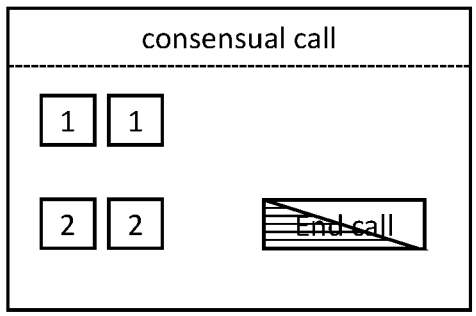
FIG. 3 shows a schematic illustration of an exemplary arrangement of buttons or display options of an interface of a participant communication terminal and/or one or more second, third or further entity according to an embodiment of the invention.

FIG. 3 shows a schematic illustration of an exemplary arrangement of buttons or display options of an interface of one or more second, third or further entity and/or participant communication terminals. In this case for a 1:1 conference session held in consensus mode with dual consensus exit. Dual consensus exit means that the two participants in this 1:1 conference session have to agree to end the session. Shown is the view of one participant, but all participants have the option "End call" to end the session, but as said before, the other participant has to end the session as well. In this case, one participant has already chosen the option "End call". This can be shown, for example, by sending a message to the other participant and indicating that one has already made the "End call" option (shown in FIG. 3 by the crossed lines within the "End call" option). The other participant can now end the session or leave it running.

Figure 4:
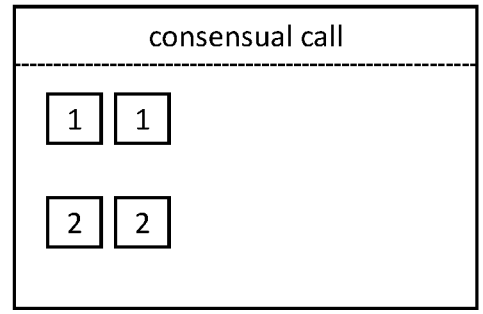
FIG. 4 shows a schematic illustration of an exemplary arrangement of buttons or display options of an interface of a participant communication terminal and/or one or more second, third or further entity according to an embodiment of the invention.

FIG. 4 shows a schematic illustration of an exemplary arrangement of buttons or display options of an interface of one or more second, third or further entity and/or participant communication terminals. In this case for a conference session held in consensus mode with a named moderator. The view of a participant is shown who is not the moderator and therefore does not have the option to end or leave the session. Therefore, only the reference that the session is in consensus mode ("consensus call") is shown.

Figure 5:
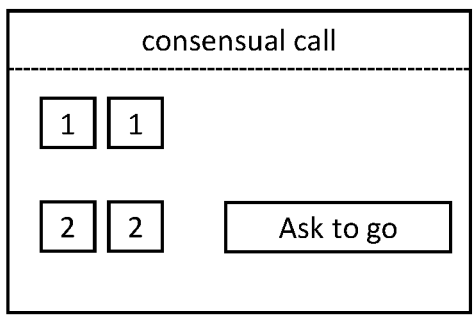
FIG. 5 shows a schematic illustration of an exemplary arrangement of buttons or display options of an interface of a participant communication terminal and/or one or more second, third or further entity according to an embodiment of the invention.

FIG. 5 shows a schematic illustration of an exemplary arrangement of buttons or display options of an interface of one or more second, third or further entity and/or participant communication terminals. In this case for a conference session held in consensus mode with a named moderator. This is the view of a participant who is not the moderator and therefore does not have the option to end or leave the session. However, in this case, the participant has the option "Ask to go" with which the participant can ask the moderator for permission to leave the session early. Then the moderator can approve this.

Figure 6:
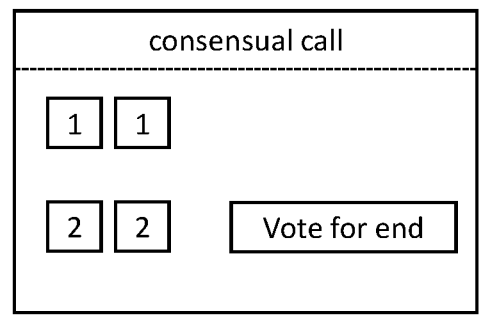
FIG. 6 shows a schematic illustration of an exemplary arrangement of buttons or display options of an interface of a participant communication terminal and/or one or more second, third or further entity according to an embodiment of the invention.

FIG. 6 shows a schematic illustration of an exemplary arrangement of buttons or display options of an interface of one or more second, third or further entity and/or participant communication terminals. In this case for a conference session held in consensus mode with or without a named moderator or where the participants or a certain number of participants must or can agree to an end of the session. In such cases, the option "Vote for end" can be displayed and activated for the participants to give their consent to end the session. Depending on what kind of session it is, 1:n or n:n, and how it is determined at which number of participants must have agreed, the session is then ended.

In all examples relating to the FIGS. 1 to 6, a predefined time period t can be set for consensus to end the meeting if more than one participant must agree or is required to vote to end the meeting. Further, conference option or buttons and/or avatars or pictures of users or participants can be depicted in boxes marked with the numbers 1 or 2 in the Figures.

Figure 7:
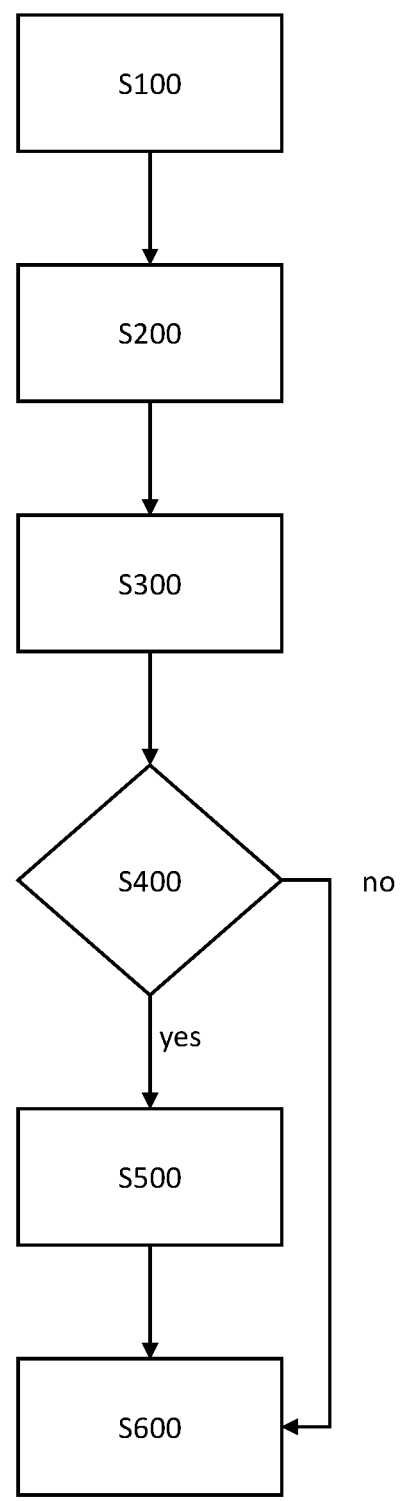
FIG. 7 shows a flowchart of the method according to another embodiment of the invention.

FIG. 7 shows a flowchart of the method for mutual consensus of meeting participants in established real-time conference sessions according to another embodiment of the invention. In a first step S100 an organizer sets up a real-time conference session on a first entity, e.g. a server. Thereby the organizer using a second entity, e.g. a client or a client application, wherein the second entity is connected to the first entity. The first entity can be any kind of server or computer which is suitable to configure and to manage a real-time conference session, for example, it can be a media server, a special conference server or a computer. As discussed above, such a device is a machine that can include a processor connected to a non-transitory memory and at least one transceiver for communicative connections to participant communication terminals. The second entity, e.g. a client or client application can be run on a computer, on any kind of smart device or smartphone, in a web application or in a browser or other type of participant communication terminal. In the next step S200 of the method the organizer invites one or more participant to the real-time conference session. Thereby, the one or more participant also using a third or further entity, e.g. a client, or a client application which is connected to the first entity like the organizer. Then, in step S300 the organizer and/or the one or more participant request from the first entity to set a consensual call flag (ccflag) which allows to hold the real-time conference session in a consensual mode (CM). In CM the organizer and/or the one or more participant can only end or exit the real-time conference session upon predefined exit options. Then, in step S400 the first entity verifies if the organizer and/or the one or more participant is allowed to set the consensual call flag (ccflag). Permission to set the ccflag can depend on a roll-based system or a hierarchy system, for example, that only supervisors or an interviewer are/is only allowed to set the ccflag. In case there is no allowance, the consensual call flag is not set, and the real-time conference session is configured by the first entity without further predefined exit options. If permission to set the ccflag is granted, then in step S500 the first entity configures the real-time conference session with additional predefined exit options. Depending on the type of session (1:1, 1:n or n:n) and if, for example, only one or more participant can terminate the session, the exit options can be different and it depends on the authorization which participant gets certain options displayed or not, or if other functions are enabled or disabled, e.g. there can be no option to leave the meeting at all for a non-authorized participant or this participant only has the option to ask if the session can be left prematurely. Finally, in step S600 the first entity immediately starts the real-time conference session or the first entity starts the session at a later time agreed by the organizer and/or the participants.

Figure 8:
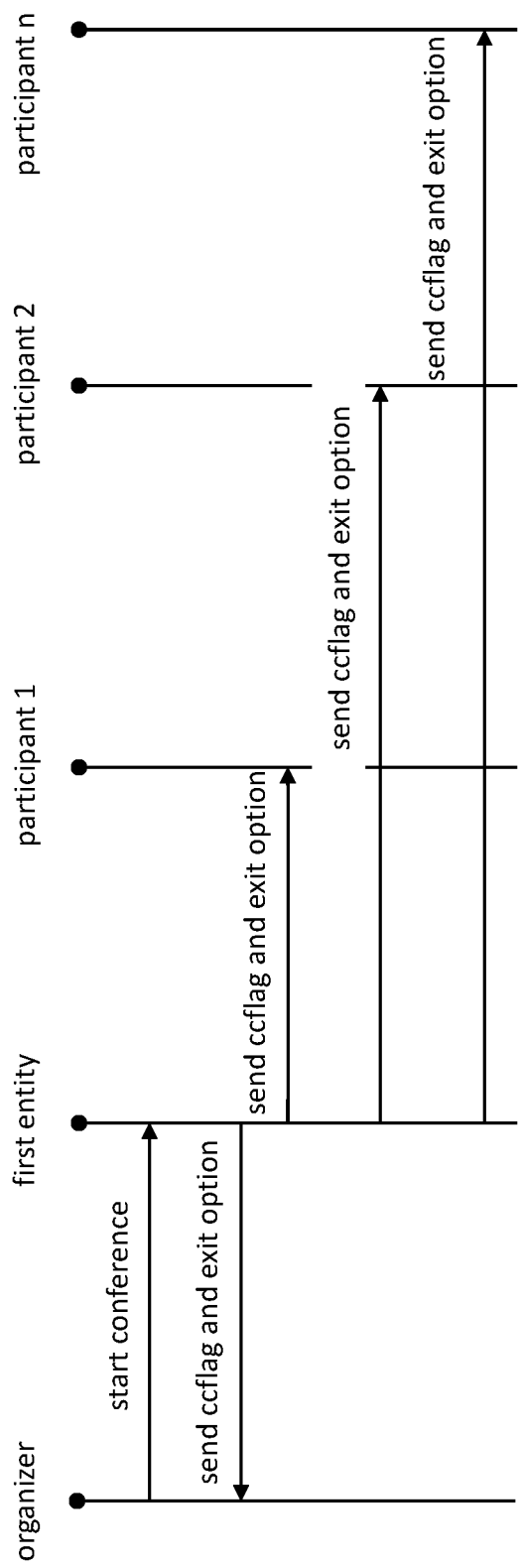
FIG. 8 shows a schematic illustration of an example for startup a conference regarding consensus function according to another embodiment of the invention.

In FIG. 8 a schematic illustration of an example for startup a conference regarding consensus function is depicted according to another embodiment of the invention. An organizer, one or more invited participant or a named moderator initiates the conference session. All participants of the session which may comprise the organizer and/or a moderator using a second, third or further entity to communicate with the first entity. Then, according to an allowed setting of a ccflag the first entity configures and starts the conference for the participants (organizer, participant 1, participant 2, participant n) according to preconfigured exit options. Further, the first entity indicates that the conference session is held in a consensus mode by sending, for example, the ccflag to the second, third or further entity of the participant(s). Thereby, the first entity configures the exit options according to the predefined permissions which every participant (organizer, participant 1, participant 2, participant n) has, for example, due to career position or due to a hierarchy or role-based system in the organization or in the company.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, communication apparatus, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for mutual consensus of meeting participants in an established real time conference session comprising:
    setting up a real time conference session on a first entity via a second entity of an organizer that is communicatively connected to the first entity, the first entity comprising a processor connected to a non-transitory computer readable medium and the second entity comprising a processor connected to a non-transitory computer readable medium;
    inviting one or more participants to the real-time conference session via at least one third entity of the one or more participants which is communicatively connectable to the first entity;
    requesting to set a consensual call flag (ccflag) to allow the real time conference session to be held in consensual mode (CM), wherein the organizer and/or the one or more participants can only end or exit the real time conference session upon predefined exit options;
    checking, by the first entity, whether the organizer and/or the one or more participants is allowed to set the ccflag, in case there is no allowance, the ccflag is not set and the real time conference session is configured by the first entity without further predefined exit options, otherwise configuring, by the first entity, the real time conference session with additional predefined exit options upon setting the ccflag by the organizer and/or the one or more participants;
    starting, by the first entity, the real time conference session immediately or at a time agreed by the organizer and/or the one or more participants.

2. The method of claim 1, wherein determining one or more moderators by the organizer and/or automatically by the first entity according to a predefined policy.

3. The method of claim 1, wherein the predefined exit options comprise at least one of: a dual mode consensus exit, a single mode consensus exit or a majority mode consensus exit.

4. The method of claim 3, wherein the dual mode consensus exit comprises that in a 1:1 or that in an n:n real time conference session all participants of the real time conference session have to agree to end the real time conference session.

5. The method according to claim 3, wherein the single mode consensus exit comprises that in a 1:1 real time conference session or in a 1:n real time conference session or in an n:n real time conference session at least one named moderator must agree to end the real time conference session and/or wherein the majority consensus exit comprises that in a n:n real time conference session a majority of N participants must agree to end the real-time conference session.

6. The method of claim 1, wherein the organizer is one of a participant, a user, an artificial intelligence or a bot that is able to set up the conference session; and/or wherein the first entity is one of a computer, a server, a media server, a conference computer or a conference server configured for operating a real time conference session; and/or
wherein one or more second, third or further entity is one of a client, an application implemented on a computer or a server, a communication terminal having a client application, a communication terminal having a browser-based application, a communication terminal having a web based application, or a communication terminal having a cloud application or a Software as a Service (SaaS) which is able to connect to the first entity and enable the organizer and/or the one or more participants to participate in the conference session.

7. The method of claim 4, comprising:
enabling, by the first entity, a hang up or disconnect option to end or exit the real time conference sessions for all participants in a 1:1 real time conference session, wherein all participants of the 1:1 real time conference sessions are enabled to use the hang up or disconnect option at a same time or within a predefined time window; and/or
providing, by the first entity, a notification to the participants of the real time conference sessions upon using the hang up or disconnect option by one participant which would then need to be confirmed by the other participant of the 1:1 real time conference sessions.

8. The method of claim 4, comprising:
disabling or hiding, by the first entity, a hang up or disconnect option to end or exit the real time conference sessions for all participants in the n:n real time conference sessions, and
providing, by the first entity, an option to vote for ending the real time conference sessions for all participants in the n:n real time conference session, wherein the real time conference session ends if all participants in the n:n real time conference sessions have selected the option to vote for ending the real time conference sessions.

9. The method of claim 5, comprising:
disabling or hiding, by the first entity, a hang up or disconnect option to end or exit the real time conference sessions for all participants except for the one or more named moderator in the 1:1 real time conference sessions or in the 1:n real time conference sessions; or
providing, by the first entity, an option to ask for permission to leave the real time conference sessions for all participants except for the one or more named moderator in the 1:1 real time conference sessions or in the 1:n real time conference sessions, wherein the one or more named moderator is authorized to grant this permission.

10. The method of claim 6, comprising:
determining by the organizer and/or automatically by the first entity according to a predefined policy a subset of mandatory participants; and
providing, by the first entity an option to vote for ending the real time conference sessions for all participants in the n:n real time conference session, wherein the real-time conference session ends in response to the subset of mandatory participants in the n:n real time conference sessions having selected the option to vote for ending the real time conference sessions.

11. The method of claim 6, comprising:
providing, by the first entity, an option to vote for ending the real time conference sessions for all participants in the n:n real time conference session, wherein the real time conference session ends in response to the majority of N participants in the n:n real-time conference sessions having selected the option to vote for ending the real-time conference sessions.

12. A system for mutual consensus of the meeting participants in established real time conference sessions, wherein the system is adapted to perform the method according claim 1.

13. The system according to claim 12, wherein the system at least comprising the first entity, the first entity configured to setup and manage the real time conference session in CM.

14. The system of claim 12, comprising one or more second, third or further entity which is connected to the first entity and is configured to participate in the real time conference session, wherein the one or more second, third or further entity is configured to end or exit the real time conference sessions according to predefined exit options when the ccflag has been set for the real time conference session.

15. The system according to claim 12, wherein the system does not offer or display a hang up or disconnect option for the one or more second, third or further entity in response to the ccflag being set such that only a moderator or mutual consensus permits all participants to end the real time conference session;
and the system is also configured to replace the hang up or disconnect option with a vote for end option for the one or more second, third or further entity.

16. The system of claim 15, wherein the system is configured so that when the ccflag is set, the system does not terminate the connection of the one or more second, third or further entity upon a hang up or disconnect by the one or more second, third or further entity; or
the system is configured so that when the ccflag is set, the system terminates a connection a participant communication terminal has to the session upon a hang up or disconnect by the communication terminal, but the system immediately re-establishes the connection of the communication terminal and, if the connection cannot be re established, the connection to the real time conference session is established each time the disconnected communication terminal tries to further connect to another different real time conference session.

17. A communication apparatus, comprising:
a first entity configured to set up a real time conference session, the first entity comprising a processor connected to a non-transitory computer readable medium;
the first entity communicatively connectable to communication terminals of conference session participants for inviting one or more conference session participants to the real-time conference session;
the first entity configured to set a consensual call flag (ccflag) to allow the real time conference session to be held in consensual mode (CM), wherein an organizer and/or the one or more participants of the real time conference session can only end or exit the real time conference session upon predefined exit options; and the first entity configured to check whether the organizer and/or the one or more participants is allowed to set the ccflag in case there is no allowance such that the ccflag is not set and the real time conference session is configured by the first entity without further predefined exit options and otherwise configuring the real time conference session with additional predefined exit options upon setting of the ccflag by the organizer and/or the one or more participants.

18. The communication apparatus of claim 17, wherein the first entity is configured to start the real time conference session immediately or at a time agreed upon by the organizer and/or the one or more participants.

* * * * *